United States Patent
Ljung et al.

(10) Patent No.: US 12,425,966 B2
(45) Date of Patent: Sep. 23, 2025

(54) SUPPORT OF MULTIPLE WAKE-UP-SIGNAL-RELATED CAPABILITIES

(71) Applicant: Sony Corporation, Tokyo (JP)

(72) Inventors: Rickard Ljung, Helsingborg (SE); Peter C. Karlsson, Lund (SE); Nafiseh Mazloum, Lund (SE)

(73) Assignee: Sony Group Corporation, Tokyo (JP)

( * ) Notice: Subject to any disclaimer, the term of this patent is extended or adjusted under 35 U.S.C. 154(b) by 86 days.

(21) Appl. No.: 17/266,585

(22) PCT Filed: Jul. 31, 2019

(86) PCT No.: PCT/EP2019/070642
§ 371 (c)(1),
(2) Date: Feb. 6, 2021

(87) PCT Pub. No.: WO2020/030497
PCT Pub. Date: Feb. 13, 2020

(65) Prior Publication Data
US 2021/0185611 A1    Jun. 17, 2021

(30) Foreign Application Priority Data
Aug. 10, 2018 (SE) .................................. 1830238-0

(51) Int. Cl.
*H04W 68/00* (2009.01)
*H04W 52/02* (2009.01)

(52) U.S. Cl.
CPC ... *H04W 52/0229* (2013.01); *H04W 52/0216* (2013.01); *H04W 68/005* (2013.01)

(58) Field of Classification Search
CPC ......... H04W 52/0229; H04W 52/0216; H04W 68/005; H04W 68/025; H04W 76/27;
(Continued)

(56) References Cited

U.S. PATENT DOCUMENTS

2018/0027495 A1    1/2018  Song
2019/0357033 A1*  11/2019  Cheng ................... H04W 16/02
(Continued)

FOREIGN PATENT DOCUMENTS

WO    2018204799 A1    11/2018

OTHER PUBLICATIONS

International Search Report and Written Opinion from corresponding International Application No. PCT/EP2019/070642, mailed on Oct. 8, 2019, 12 pages.
(Continued)

*Primary Examiner* — Marcos L Torres
(74) *Attorney, Agent, or Firm* — Tucker Ellis LLP

(57) ABSTRACT

A method of operating a network node (112, 131, 132) includes receiving control messages (4011) being indicative of capabilities of the terminals (101-103; 104-105) sharing a paging occasion (211-213) to support one or more wake-up signals (601-603) of a set (650) of wake-up signals (601-603). The method also includes determining a subset (651-653) from the set (650) of wake-up signals (601-603) based on the capabilities of the terminals (101-103; 104-105), the subset (651-653) including at least one wake-up signal (601-603) for use at the paging occasion (211-213).

17 Claims, 10 Drawing Sheets

(58) Field of Classification Search
CPC ... H04W 76/28; H04W 52/0235; Y02D 30/70
See application file for complete search history.

(56) References Cited

U.S. PATENT DOCUMENTS

2020/0045635 A1* 2/2020 Lin .................. H04W 52/0248
2020/0145921 A1* 5/2020 Zhang .............. H04W 52/0229
2021/0037470 A1* 2/2021 Åström ............ H04W 52/0229

OTHER PUBLICATIONS

Swedish Office Action with Search Report from corresponding Swedish Application No. 1830238-0, Mar. 26, 2019, 7 pages.
Ericsson, "Wake-up signal configurations and procedures for Nb-Iot", 3GPP TSG-RAN WG1 Meeting #93, R1-1805855, dated May 20-24, 2018, 9 pages.
Huawei et al., "Feature lead summary of Wake-up signal configurations and procedures in NB-IoT", 3GPP TSG-RAN WG1 Meeting #93, R1-1807471, dated May 21-25, 2018, 18 pages.
Huawei et al., "Updated feature lead summary of Wake-up signal configurations and procedures in NB-IoT", 3GPP TSG-RAN WG1 Meeting #93, R1-1807560, dated May 21-25, 2018, 19 pages.
Ericsson, "Wake-up signal for NB-IoT & eMTC", 3GPP TSG-RAN WG2 #100, R2-1713033, dated Nov. 27-Dec. 1, 2017, 9 pages.
Nokia: "Wake-up signal configurations and procedures"; 3GPP TSG RAN WG1 Meeting 93; R1-1806159; dated May 21-25, 2018; 8 pages.
Ericsson, "Wake Up Signal in NB-IoT and MTC", R2-1802586, 3GPP tsg_ran\WG2_RL2, TSGR2_101, Feb. 26, 2018, full text.

* cited by examiner

SUPPORT OF MULTIPLE WAKE-UP-SIGNAL-RELATED CAPABILITIES

TECHNICAL FIELD

Various examples of the invention generally relate to wake-up signal functionality. Various examples of the invention specifically relate to strategies for supporting heterogeneous capability of terminals to support wake-up signals.

BACKGROUND

In the Third Generation Partnership Project (3GPP) standardization of wireless communication, a functionality for communicating wake-up signals (WUSs) has been introduced for Release 15. The solution is applicable to both Narrowband Internet of Things (NB-IoT) and Machine Type Communication (MTC) versions of the Long Term Evolution (LTE) standard. It is also expected that the upcoming New Radio (NR) 5G standards will support WUS techniques.

In further detail, a WUS is transmitted prior to a paging occasion (PO) to inform terminals (user equipment; UEs) that there is at least one UE that will be paged at the PO. Then, at least one paging signal—e.g., a paging indicator and a paging message—can be transmitted at the PO.

Typically, a dedicated WUS receiver (typically referred to as wake up radio, WUR; sometimes also referred to as low-power receiver) is used detect the WUS. By means of the specific design of the WUR, it is intend to limit energy consumption.

In the 3GPP LTE Release 15 specifications, the WUS is based on signal design very similar to other LTE signals, which means that a WUR may re-use all or most of the functionality of an ordinary LTE radio (main receiver, MRX). If, however, the WUS signal design was constructed with a waveform simpler to detect, there could be a possibility for UE modem manufactures to implement a separate WUR, i.e., having tailored hardware different from the MRX, which could consume less energy than a normal LTE radio when listening and receiving WUS.

Current implementations of the WUS functionality face certain limitations and drawbacks. One particular drawback is the limitation in flexibility for the design of the WUR. For example, the WUR needs to meet certain minimum specification requirements to be able to receive the WUS.

SUMMARY

Therefore, a need exists for advanced WUS techniques. A need exists that overcomes or mitigates at least some of the above-identified limitations and drawbacks.

This need is met by the features of the independent claims. The features of the dependent claims define embodiments.

A method of operating a network node includes receiving control messages being indicative of capabilities of the terminals to support one or more wake-up signals of a set of wake-up signals. The terminals may share a paging occasion. The method also includes determining a subset from the set of wake-up signals based on the capabilities of the terminals indicated by the received control messages. The subset includes at least one wake-up signal for use at the paging occasion.

A computer program includes program code that can be executed by at least one processor. Executing the program code causes the at least one processor to perform a method of operating a network node which method includes receiving control messages being indicative of capabilities of the terminals to support one or more wake-up signals of a set of wake-up signals. The terminals may share a paging occasion. The method also includes determining a subset from the set of wake-up signals based on the capabilities of the terminals indicated by the received control messages. The subset includes at least one wake-up signal for use at the paging occasion.

Also, a computer program product and a computer-readable storage medium are provided which include such program code.

A network node is configured to receive control messages being indicative of capabilities of the terminals to support one or more wake-up signals of a set of wake-up signals. The terminals share a paging occasion. The network node is also configured to determine a subset from the set of wake-up signals based on the capabilities of the terminals indicated by the received control messages, the subset including at least one wake-up signal for use at the paging occasion. For example, a control circuitry, e.g., implemented by a processor and a memory, of the network node may be configured to perform such actions.

A method of operating a terminal includes transmitting a control message to a network. The control message is indicative of a capability of the terminal to support one or more wake-up signals of a set of wake-up signals. The method also includes receiving a configuration control message from the network. The configuration control message is indicative of a subset of the set of wake-up signals. The subset includes at least one wake-up signal. The method further includes detecting a given wake-up signal of the at least one wake-up signal included in the subset at a paging occasion.

A computer program includes program code that can be executed by at least one processor. Executing the program code causes the at least one processor to perform a method of operating a terminal which method includes transmitting a control message to a network. The control message is indicative of a capability of the terminal to support one or more wake-up signals of a set of wake-up signals. The method also includes receiving a configuration control message from the network. The configuration control message is indicative of a subset of the set of wake-up signals. The subset includes at least one wake-up signal. The method further includes detecting a given wake-up signal of the at least one wake-up signal included in the subset at a paging occasion.

Also, a computer program product and a computer-readable storage medium are provided which include such program code.

A terminal is configured to transmit a control message to a network. The control message is indicative of a capability of the terminal to support one or more wake-up signals of a set of wake-up signals. The terminal is also configured to receive a configuration control message from the network, the configuration control message being indicative of a subset of the set of wake-up signals, the subset including at least one wake-up signal. The terminal is also configured to detect a given wake-up signal of the at least one wake-up signal included in the subset at a paging occasion.

A system includes a terminal and a network node of a network. The terminal is configured to transmit a control message to the network. The control message is indicative of a capability of the terminal to support one or more wake-up signals of a set of wake-up signals. The network node is configured to receive this control message from the terminal and further control messages from further terminals, the control message and the further control messages being indicative of capabilities of the terminal and the further terminal to support one or more wake-up signals of a set of wake-up signals. The terminal and the further terminals share a paging occasion. The network node is also configured to determine a subset from the set of wake-up signals based on the capabilities, the subset including at least one wake-up signal for use at the paging occasion. For example, a control circuitry, e.g., implemented by a processor and a memory, of the network node may be configured to perform such actions.

It is to be understood that the features mentioned above and those yet to be explained below may be used not only in the respective combinations indicated, but also in other combinations or in isolation without departing from the scope of the By such techniques, it becomes possible to flexibly support heterogeneous capabilities of UEs to support various WUSs.

By such techniques, it becomes possible to tailor the use of WUSs to reduce the power consumption and/or control-signaling overhead.

DETAILED DESCRIPTION OF EMBODIMENTS

Figure 1:
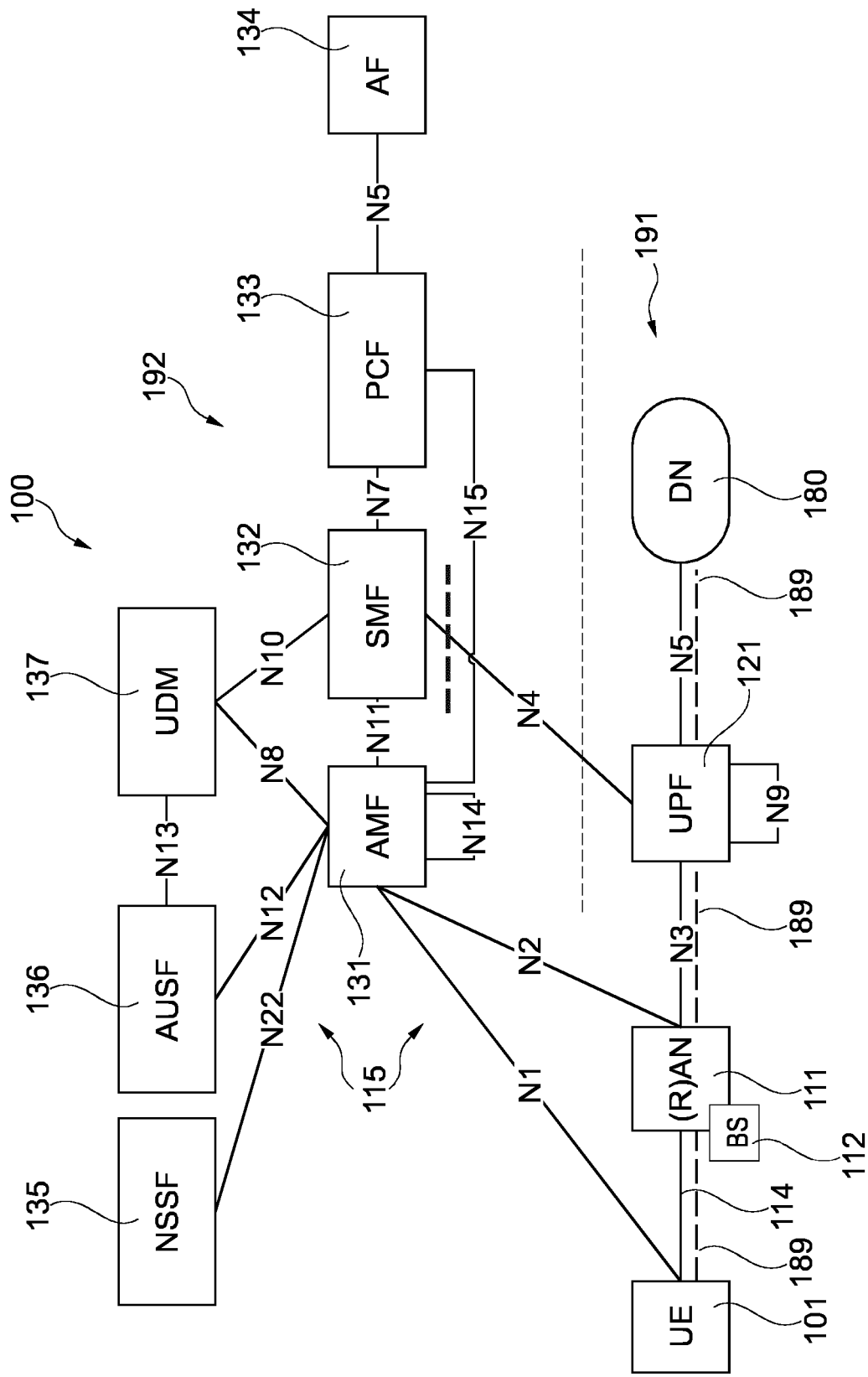
FIG. 1 schematically illustrates a cellular network providing WUS functionality to UEs according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, WUS functionality is described. The WUS functionality enables a UE to transition a MRX into a low-power state, e.g., for power saving purposes. Then, a WUR can be used to detect a WUS. Typically, a modulation scheme of the WUS is comparably simple. A simple waveform results in a WUS that may be detected comparably with a lower UE processing complexity than other signals such as data reception. The waveform may be detectable using time-domain processing. Synchronization (e.g. in time domain) between a transmitter and a receiver may not be required or can be coarse. Generally, detection of the WUS can require less complexity at the WUR if compared to a MRX. At the same time, the power consumption of the WUR can be significantly smaller than the power consumption of the MRX during normal operation. Hardware wise the MRX and WUR may share all, parts of or no components with each other.

In certain operational modes of the UE, it is then possible to transition the MRX into an inactive state. In the inactive state, it is typically not required to fully power or even partly power components of the MRX. At the same time, the WUR can be used to detect WUSs.

Therefore, by means of the WUS functionality, the power consumption at the UE can be significantly reduced.

In further detail, the WUS functionality may help to avoid blind decoding of a control channel during a PO. Since typically such blind decoding is comparably energy inefficient, thereby, power consumption can be reduced by using WUSs. This is explained in greater detail hereinafter: For example, in the 3GPP scenario, during POs, the UE is expected to blind decode the control channels Machine-type Physical Downlink Control Channel (MPDCCH) for Machine Type Communication or the Physical Downlink Control Channel (PDCCH) for LTE or the Narrowband PDCCH (NPDCCH) for NB-IOT. The blind decoding during the POs is for a paging radio network temporary identifier (P-RNTI) as paging identity, typically transmitted in as a so-called paging indicator. If presence of a paging indicator including the P-RNTI is detected, the UE continues to decode a subsequent data shared channel (PDSCH) for a paging message. The blind decoding is comparably energy inefficient and by means of the WUS functionality can be conditionally triggered by a preceding WUS.

Various techniques described herein are based on the finding that the ability to reduce power consumption at the UE correlates with the hardware design of the WUR. Further, various techniques are based on the finding that the hardware design of the WUR may vary, e.g., depending on the chipset manufacturer, the device type, etc. Thus, there may be a situation where the capability to detect WUSs of a certain kind—i.e., having a certain signal design—varies from UE to UE. Heterogeneous capabilities of the UEs to support WUSs are observed.

From a network perspective, this heterogeneous support of WUS signal designs imposes certain restrictions on the flexibility in the selection of the WUSs. For example, according to reference implementations, the network may be forced to use a less energy-efficient WUS for certain UEs, to be able to support WUS techniques for other UEs. From a global perspective, the overall energy consumption across an ensemble of UEs may be suboptimal. Also, individual UEs may suffer from the need to support sub-optimal WUS signal designs which can result in an increased power consumption.

Hereinafter, techniques are described which help to mitigate such restrictions that are arising from the heterogeneous support of WUS signal designs across multiple UEs. Specifically, techniques are described that facilitate a flexible support of multiple WUS signal designs, to thereby individually tailor the WUS techniques depending on the encountered WURs.

In further detail, various techniques described herein facilitate flexible configuration of the WUSs used to address a plurality of UEs. According to various examples, options for a flexible signal design for WUSs are provided. Specifically, options are provided to support multiple WUSs, i.e., different types of WUSs that have different signal designs and/or are designed to be transmitted with different relative timing in relation to the corresponding PO. Thereby, different kinds and types of WURs can be supported, i.e., WURs having different capabilities can be supported. For example, where a—e.g., predefined—set of WUSs is available for transmission, it can be possible to flexible determine a subset of the set of WUSs for transmission prior to one or more POs.

According to various examples described herein, this is achieved by taking into account the capabilities of the WURs of a plurality of UEs, e.g., per-cell or per-PO. For example, the network may determine the subset of the set of WUSs, i.e., the network may select one or more WUSs from the set of WUSs to transmit prior to the paging occasion and select one or more WUS timings for transmission prior to the paging occasion. In more general terms, one or more parameters of the WUS signal design may be determined per PO.

According to an example implementation, a base station (BS) or another node of a network receives control messages. The control messages are indicative of capabilities of multiple terminals that share a PO to respectively support one or more WUSs of a set of WUSs. The method also includes determining a subset of the set of WUSs, based on the capabilities of the terminals. The subset includes at least one WUS for use at the PO.

As will be appreciated, such techniques allow to employ multiple different types of WUSs. For example, depending on the capability of the WURs of the UEs that share a given PO, one or more WUSs may be selected from the set of available WUSs for transmission prior to the given PO. This helps to provide a suitable WUSs to all or at least some of the UEs that share a given PO. These UEs can then have a low power consumption.

FIG. 1 schematically illustrates a cellular network 100. The example of FIG. 1 illustrates the network 100 according to the 3GPP 5G architecture. Details of the fundamental architecture are described in 3GPP TS 23.501, version 1.3.0 (2017-09). While FIG. 1 and further parts of the following description illustrate techniques in the 3GPP 5G framework of a cellular network, similar techniques may be readily applied to other communication protocols. Examples include 3GPP LTE 4G—e.g., in the MTC or NB-IOT framework—and even non-cellular wireless systems, e.g., an IEEE Wi-Fi technology.

In the scenario of FIG. 1, a UE 101 is connectable to the cellular network 100. For example, the UE 101 may be one of the following: a cellular phone; a smart phone; and IOT device; a MTC device; a sensor; an actuator; etc.

The UE 101 is connectable to the network 100 via a radio access network (RAN) 111, typically formed by one or more BSs 112 (only a single BS 112 is illustrated in FIG. 1 for sake of simplicity). A wireless link 114 is established between the RAN 111—specifically between one or more of the BSs 112 of the RAN 111—and the UE 101.

The RAN 111 is connected to a core network (CN) 115. The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data network 180, e.g., the Internet or a Local Area Network. Application data can be communicated between the UE 101 and one or more servers on the data network 180.

The network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: registration management; NAS termination; connection management; reachability management; mobility management; access authentication; and access authorization the AMF 131 can negotiate an NAS-level security context with the UE 101. See 3GPP TS 23.501 version 1.3.0 (2017-09), section 6.2.1. For example, the AMF 131 controls CN-initiated paging of the UEs 101 if the respective UE 101 operates in RRC idle mode. The AMF 131 may keep track of the timing of a discontinuous reception (DRX) cycle of the UE 101. The AMF 131 may trigger transmission of WUSs and/or of paging signals to the UE 101; this may be time-aligned with POs that are defined in connection with on durations of the DRX cycle.

A data connection 189 is established by the AMF 131 if the respective UE 101 operates in a connected mode. To keep track of the current mode of the UEs 101, the AMF 131 sets the UE 101 to ECM connected or ECM idle. During ECM connected, a non-access stratum (NAS) connection is maintained between the UE 101 and the AMF 131. The NAS connection implements an example of a mobility control connection. The NAS connection may be set up in response to paging of the UE 101.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc. As such, the AMF 131 and the SMF 132 both implement CP mobility management needed to support a moving UE.

In some examples described herein, the AMF 131 and/or the SMF 132 may also be configured to support determination of a subset from a set of supported WUSs.

The data connection 189 is established between the UE 101 via the RAN 111 and the DP 191 of the CN 115 and towards the DN 180. For example, a connection with the Internet or another packet data network can be established. To establish the data connection 189, it is possible that the respective UE 101 performs a random access (RACH) procedure, e.g., in response to reception of a paging signal and, optionally, a preceding WUS. A server of the DN 180 may host a service for which payload data is communicated via the data connection 189. The data connection 189 may include one or more bearers such as a dedicated bearer or a default bearer. The data connection 189 may be defined on the RRC layer, e.g., generally Layer 3 of the OSI model of Layer 2.

Figure 2:
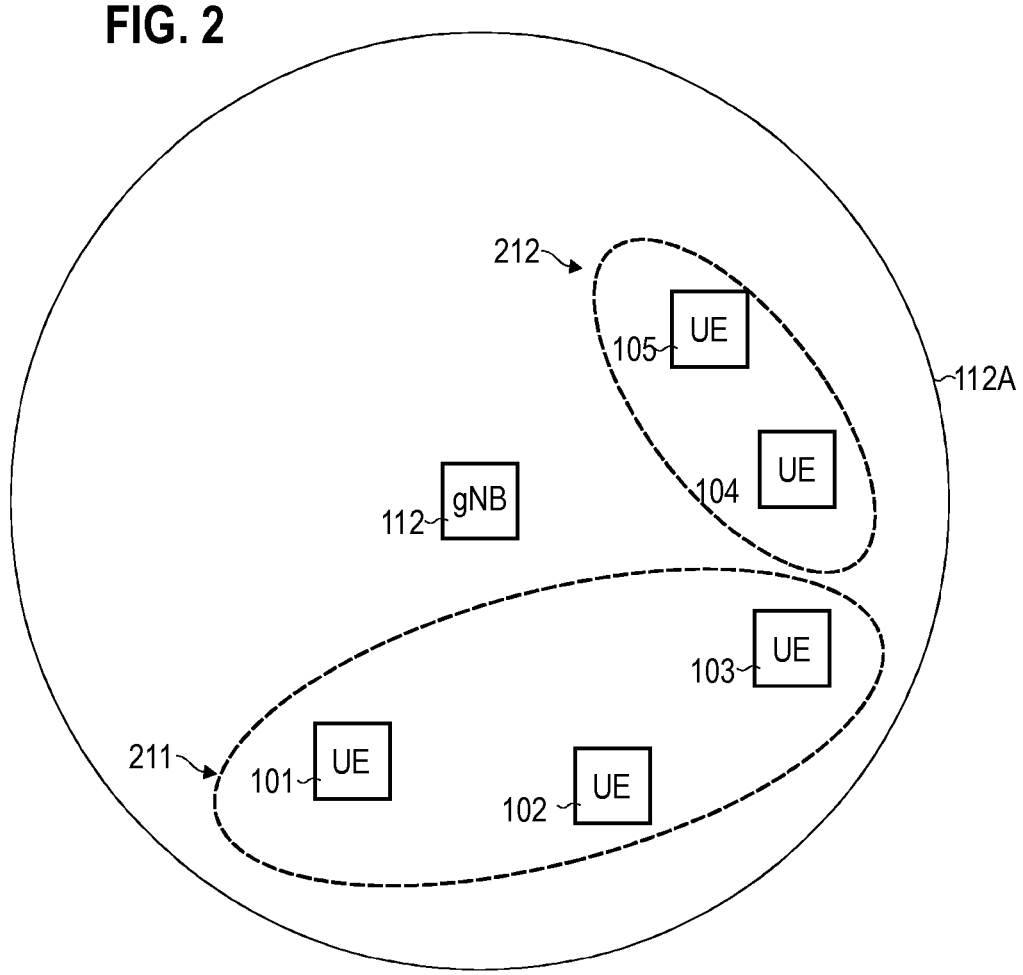
FIG. 2 schematically illustrates multiple UEs connected or connectable to the cellular network according to various examples.

FIG. 2 illustrates aspects with respect to the RAN 111. In the scenario of FIG. 2, multiple UEs 101-105 are connected to the BS 112 of the RAN 111. For example, the UEs 101-103 share a first PO 211; while the UEs 104-105 share a second PO 212 (schematically illustrated in FIG. 2 by the dashed lines).

Sharing a PO can correspond to multiple UEs being assigned to the same PO. Hence, if the network intends to page one of the multiple UEs sharing a PO, one or more respective paging signals may be transmitted at the PO.

The UEs 101-105 can be assigned to the various POs 211, 212 according to various criteria such as a subscriber entity associated with a subscriber of the respective UE 101-105.

FIG. 2 schematically illustrates a cell 112A associated with the BS 112. Typically, multiple cells 112A form a tracking area (TA). Paging strategies are typically implemented on per-TA level. A paging strategy is typically network vendor/operator-specific implementation aspect. For example, the network typically doesn't know exactly in which cell 112A a UE 101-105 is currently camping in, but only within a certain group of cells which form the TA. Hence, it's relevant for a network to define similar paging strategy for a whole tracking area, but it is not mandatory to do so, since it is network implementation specific and not standardized. As a general rule, various settings associated with WUS functionality may or may not vary across a TA.

Figure 3:
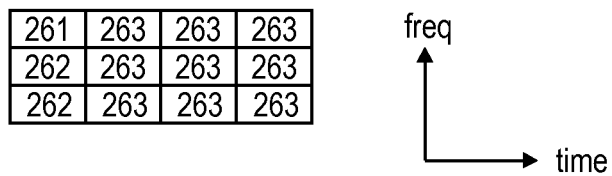
FIG. 3 schematically illustrates multiple channels implemented on a wireless link of the cellular network according to various examples.

FIG. 3 illustrates aspects with respect to channels 261-263 implemented on the wireless link 114. The wireless link 114 implements a plurality of channels 261-263. The resources of the channels 261-263 are offset from each other, e.g., in frequency domain and/or time domain. For example, separate carriers may be used for different ones of the channels 261-263; alternatively, it would also be possible to use a carrier with multiple subcarriers, e.g., according to Orthogonal Frequency Division Multiplexing (OFDM).

For example, a first channel 261 may carry WUSs. The WUSs enable the network 100—e.g., the AMF 131—to wake-up a UE 101-105 prior to a PO.

A second channel 262 may carry paging indicators which enable the network 100—e.g., the AMF 131—to page a UE 101-105 during a PO. Typically, the paging indicators are communicated on PDCCH, MPDCCH, or NPDCCH, depending on the scenario.

As will be appreciated from the above, the WUSs and the paging indicators may be different from each other in that they are transmitted on different channels 261, 262. Different resources may be allocated to the different channels 261-263.

Further, a third channel 263 is associated with a payload messages carrying higher-layer user-plane data packets associated with a given service implemented by the UEs 101-105 and the BS 112 (payload channel 263). User-data messages may be transmitted via the payload channel 263. Alternatively, control messages may be transmitted via the channel 263, e.g., a paging message.

Figure 4:
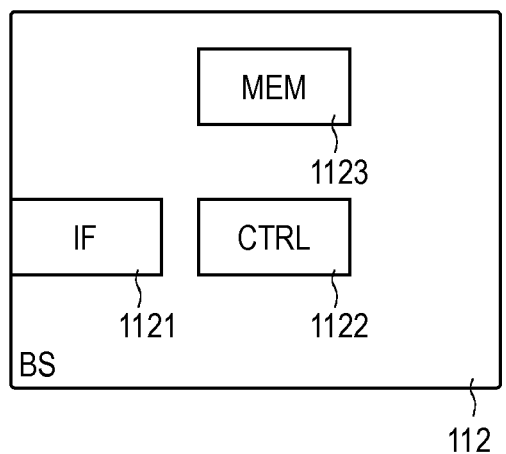
FIG. 4 schematically illustrates a base station of radio access network of the cellular network according to various examples.

FIG. 4 schematically illustrates the BS 112. The BS 112 includes an interface 1121. For example, the interface 1121 may include an analog front end and a digital front end. The interface can support multiple signal designs, e.g., different modulation schemes, coding schemes, and/or multiplexing schemes, etc. The BS 112 further includes control circuitry 1122, e.g., implemented by means of one or more processors and software. For example, program code to be executed by the control circuitry 1122 may be stored in a non-volatile memory 1123. In the various examples disclosed herein, various functionality may be implemented by the control circuitry 1122, e.g.: receiving WUS-related capabilities from UEs; comparing the WUS-related capabilities of the UEs; determining at least one WUS to be used per PO, based on the WUS-related capabilities; transmitting a WUS-related configuration to the UEs; transmitting and/or triggering transmission of the at least one WUS prior to the PO; etc.

Generally, also other nodes of the network 100 may be configured in a manner comparable to the configuration of the BS 112, e.g., the AMF 131 or the SMF 132.

Figure 5:
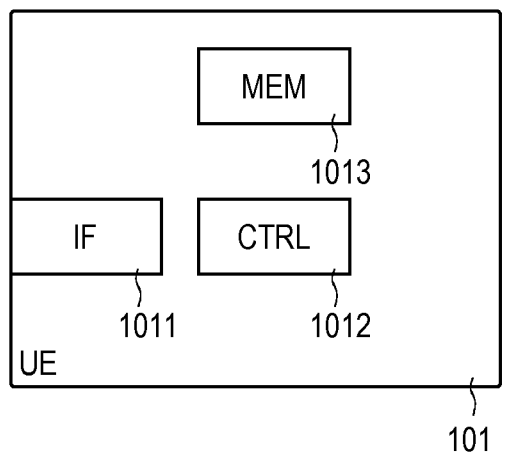
FIG. 5 schematically illustrates a UE according to various examples.

FIG. 5 schematically illustrates the UE 101. The UE 101 includes an interface 1011. For example, the interface 1011 may include an analog front end and a digital front end. In some examples, the interface 1011 may include a MRX and a WUR. Each one of the MRX and the WUR may include an analog front end and a digital front end, respectively. The MRX and the WUR can support different signal designs. For example, the WUR may typically support simpler signal designs that the MRX. For example, the WUR may only support simpler modulations, modulation schemes having lower constellations, etc. The WUR may, e.g., not support OFDM demodulation. The WUR may support time-domain processing; but may not support synchronized demodulation. The UE 101 further includes control circuitry 1012, e.g., implemented by means of one or more processors and software. The control circuitry 1012 may also be at least partly implemented in hardware. For example, program code to be executed by the control circuitry 1012 may be stored in a non-volatile memory 1013. In the various examples disclosed herein, various functionality may be implemented by the control circuitry 1012, e.g.: transmitting a WUS-related capability to a network; receiving a WUS-related configuration; detecting a WUS in accordance with the WUS-related configuration; etc.

Figure 6:
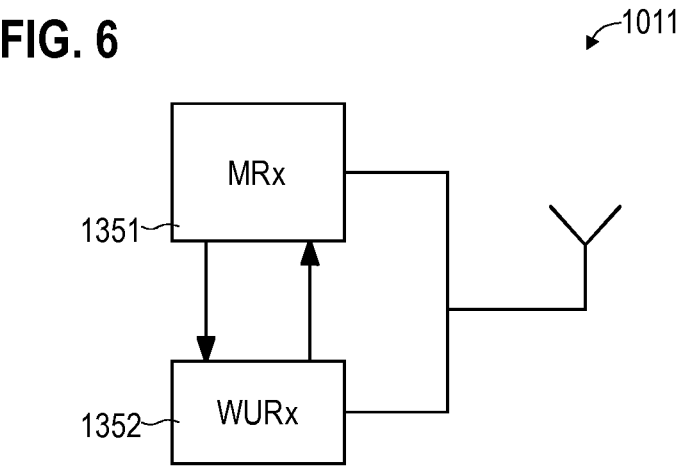
FIG. 6 schematically illustrates a MRX and a WUR of an interface of a UE according to various examples.

FIG. 6 illustrates details with respect to the interface 1011 of the UE 101. In particular, FIG. 6 illustrates aspects with respect to a MRX 1351 and a WUR 1352. In FIG. 6, the MRX 1351 and the WUR 1352 are implemented as separate entities. For example, they may be implemented on different chips. For example, they may be implemented in different housings. For example, they may not share a common power supply.

The scenario FIG. 6 may enable switching off some or all components of the MRX 1351 when operating the MRX in inactive state. In the various examples described herein, it may then be possible to receive WUSs using the WUR 1352. Also, the WUR 1352 may be switched between an inactive state and an active state, e.g., according to a DRX cycle. For example, the WUR 1352 may be transitioned to an active state at a given time offset prior to a PO.

For example, if the MRX 1351 is switched on, the WUR 1352 may be switched off, and vice-versa. As such, the MRX 1351 and the WUR 1352 may be inter-related in operation (indicated by the arrows in FIG. 6).

Figure 7:
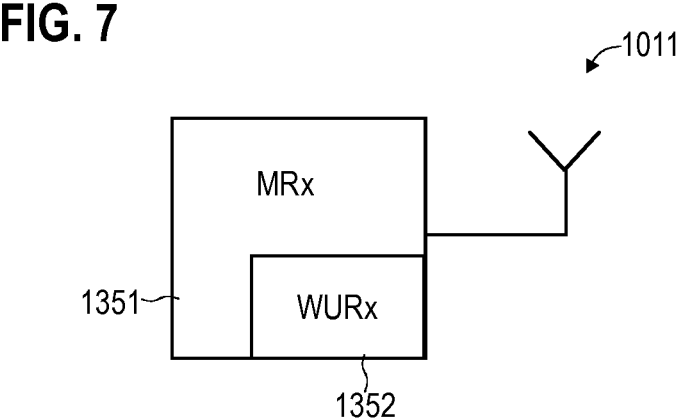
FIG. 7 schematically illustrates a MRX and a WUR of a UE according to various examples.

FIG. 7 illustrates details with respect to the interface 1011 of the UE 101. In particular, FIG. 7 illustrates aspects with respect to the MRX 1351 and the WUR 1352. In FIG. 7, the MRX 1351 and the WUR 1352 are implemented as a common entity. For example, they may be implemented on a common chip, i.e., integrated on a common die. For example, they may be implemented in a common housing. For example, they may share a common power supply.

The scenario FIG. 7 may enable a particular low latency for transitioning between reception—e.g., of a WUS—by the WUR 1352 and reception by the MRX 1351.

While in FIGS. 6 and 7 a scenario is illustrated where the MRX 1351 and the WUR 1352 share a common antenna, in other examples, it would be also possible that the interface 1011 includes dedicated antennas for the MRX 1351 and the WUR 1352.

While in the examples of FIGS. 6 and 7 scenarios are illustrated where there is a dedicated WUR 1352, in other examples there may be no WUR. Instead, the WUS may be received by the MRX 1351 in a low-power state. For example, the MRX 1351 may not be fit to receive ordinary data other than the WUS in the low-power state. Then, in response to receiving the WUS, the MRX 1351 may transition into a high-power state in which it is fit to receive the ordinary data, e.g., on channel 263, etc.

Thus, more generally speaking, there is a wide variety of options available for implementing the receiver hardware that facilitates reception of the WUS.

Figure 8:
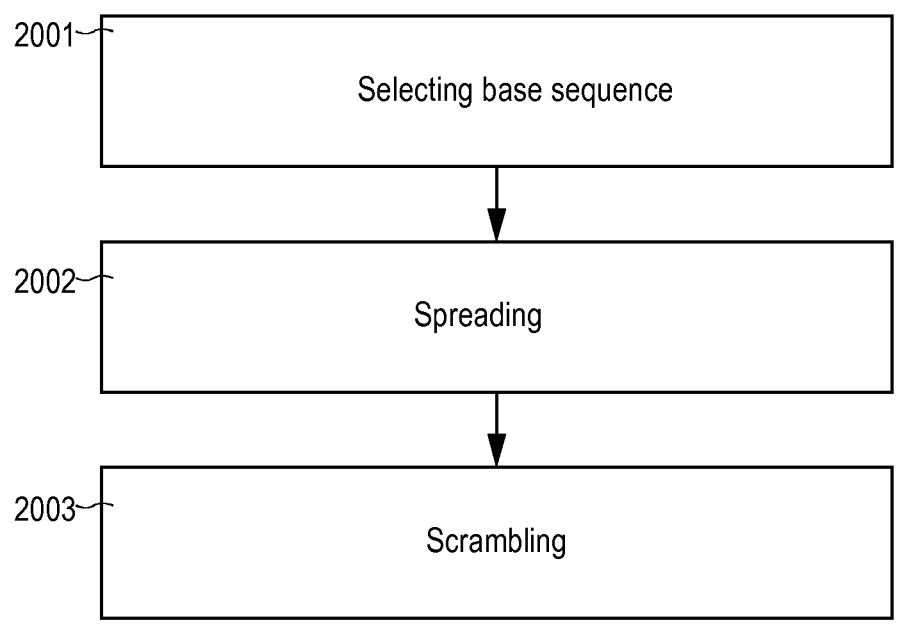
FIG. 8 schematically illustrates generation of a WUS according to various examples.

FIG. 8 is a flowchart of a method according to various examples. FIG. 8 illustrates aspects with respect to constructing or generating the WUS. FIG. 8 schematically illustrates various aspects with respect to signal design of a WUS.

For example, the method according to FIG. 8 could be executed by the control circuitry 1122 of the BS 112. In the various examples described herein, it may be possible to construct the WUSs according to the method of FIG. 8. As a general rule, there may be a set of WUSs available, each WUS of the set of WUS having one or more specific signal design parameters as explained below in connection with the blocks 2001-2003.

First, a certain base sequence is selected, 2001. For example the base sequence may be a randomly generated set of bits. For example the base sequence may be unique for a UE or a group of UEs. For example, the base sequence may be unique for a cell 161-168 of the network 100. For example, the base sequence may be selected from the group including: a Zadoff-Chu sequence; a sequence selected from a set of orthogonal or quasi-orthogonal sequences; and a Walsh-Hadamard sequence. For example, selecting the particular base sequence or type of base sequence can be subject to signal design of the WUS. For example, setting the sequence length of the base sequence of the WUS can be subject to signal design of the WUS. Selecting the base sequence can be subject to signal design of the WUS.

Next, spreading may be applied to the base sequence, 2002. When spreading a bit sequence, the incoming bit sequence is spread/multiplied with a spreading sequence. This increases the length of the incoming bit sequence by a spreading factor K. The resulting bit sequence can be of the same length as the incoming bit sequence times the spreading factor. Details of the spreading can be set by a spreading parameter. For example, the spreading parameter may specify the spreading sequence, e.g., a length of the spreading sequence or individual bits of the spreading sequence. Setting the spreading parameter can be subject to signal design of the WUS.

Then, scrambling may be applied to the spread base sequence, 2003. Scrambling may relate to inter-changing or transposing a sequence of the bits of the incoming bit sequence according to one or more rules. Scrambling provides for randomization of the incoming bit sequence. Based on a scrambling code, the original bit sequence can be reproduced at the receiver. Details of the scrambling can be set by a scrambling parameter. For example, the scrambling parameter can identify the one or more rules. For example, the scrambling parameter can relate to the scrambling code. Setting the scrambling parameter can be subject to signal design of the WUS.

In some examples, it may be possible to additionally add a checksum to the WUS. Adding a checksum may be subject to signal design of the WUS. For example, a checksum protection parameter may set whether to include or to not include the checksum. For example, the checksum protection parameter may set a length of the checksum. For example, the checksum protection parameter may set a type of the checksum, e.g., according to different error-correction algorithms, etc. The checksum may provide for joint error detection and, optionally, correction capability across the entire length of the WUS.

In some examples, it may be possible to add a preamble to the WUS. The preamble may include a sequence of preamble bits. For example, the sequence of preamble bits may have a specific length. The sequence of preamble bits may enable robust identification of the WUS, e.g., even in presence of burst errors, channel delay spread, etc. Presence of the preamble, length of the preamble, and/or type of the preamble sequence, etc. can be properties that can be set according to a preamble parameter in signal design of the WUS.

Finally, at block 2004, the bit sequence obtained from blocks 2001-2003 is modulated in accordance with a modulation scheme, e.g., On-Off-Keying (OOK) or Frequency Shift Keying (FSK), etc. This corresponds to analog processing. Different modulation schemes can be represented by different constellations. Also, within a given modulation scheme, it is sometimes possible to change the bit loading, i.e., increasing or decreasing the number of bits per symbol and, thereby, changing the modulation constellation. All such modulation-related parameters can be subject to the signal design of the WUS. Different WUSs can be associated with different modulation schemes and/or different modulation constellations.

Figure 9:
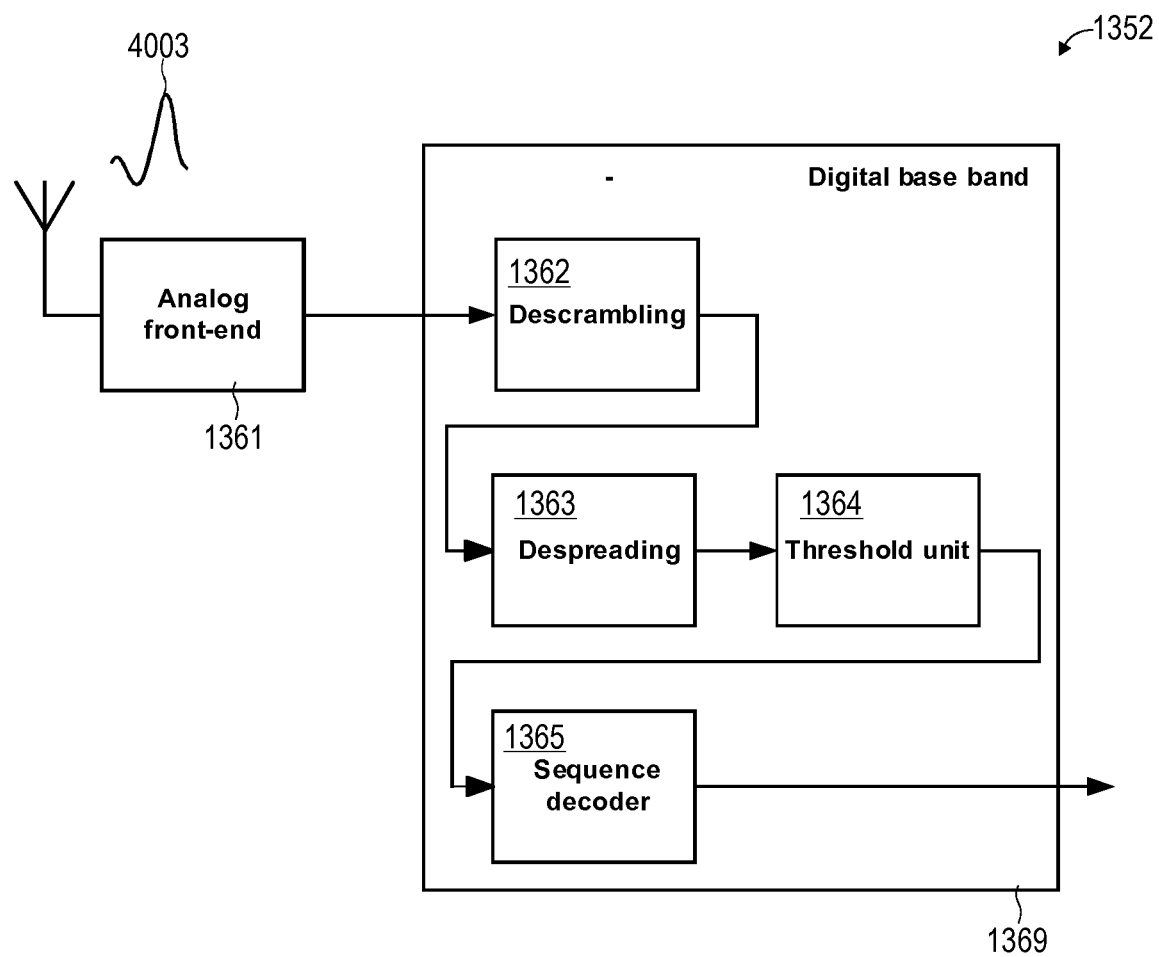
FIG. 9 schematically illustrates detection of a wake-up signal according to various examples.

FIG. 9 illustrates aspects with respect to the detection of a WUS 601 by means of the WUR 1352.

The analog front end 1361 outputs a bit sequence corresponding to the WUS 601 in the baseband to the digital front end 1369. For this, a demodulation can be employed that is tailored to the modulation scheme and/or the modulation constellation according the signal design of the WUS 601. Typically, different WURs 1352 include analog front ends 1361 that differ in the supported modulation schemes and/or modulation constellations. Often, synchronized modulation—in which a synchronization (in time domain and/or in frequency domain) of the analog front end 1361 with the transmitter is established—may not be supported by the WUR 1352. There may be provided a symbol-level buffer at the analog front end 1351. Then, based on a demodulator, a symbol sequence in the buffer may be transformed to a bit sequence. This may mark the transition from symbol level to bit level. Bit level processing is then handled in digital domain by the digital front end.

De-scrambling functionality 1362 then performs de-scrambling.

Next, de-spreading functionality 1363 is applied.

A threshold unit 1364 is provided next.

A sequence decoder 1365 employs a decoding algorithm to the bit sequence. Finally, the base sequence employed at the transmitter is thus reassembled.

It is then possible to perform a cross-correlation between the base sequence and a reference sequence. If the cross correlation yields a significant result, it can be judged that the WUS 601 was addressed to the particular UE 101 and possibly further UEs 102-105. Based on said cross correlating, it is then possible to selectively transition the MRX 1351 from an inactive state to an active state.

Figure 10:
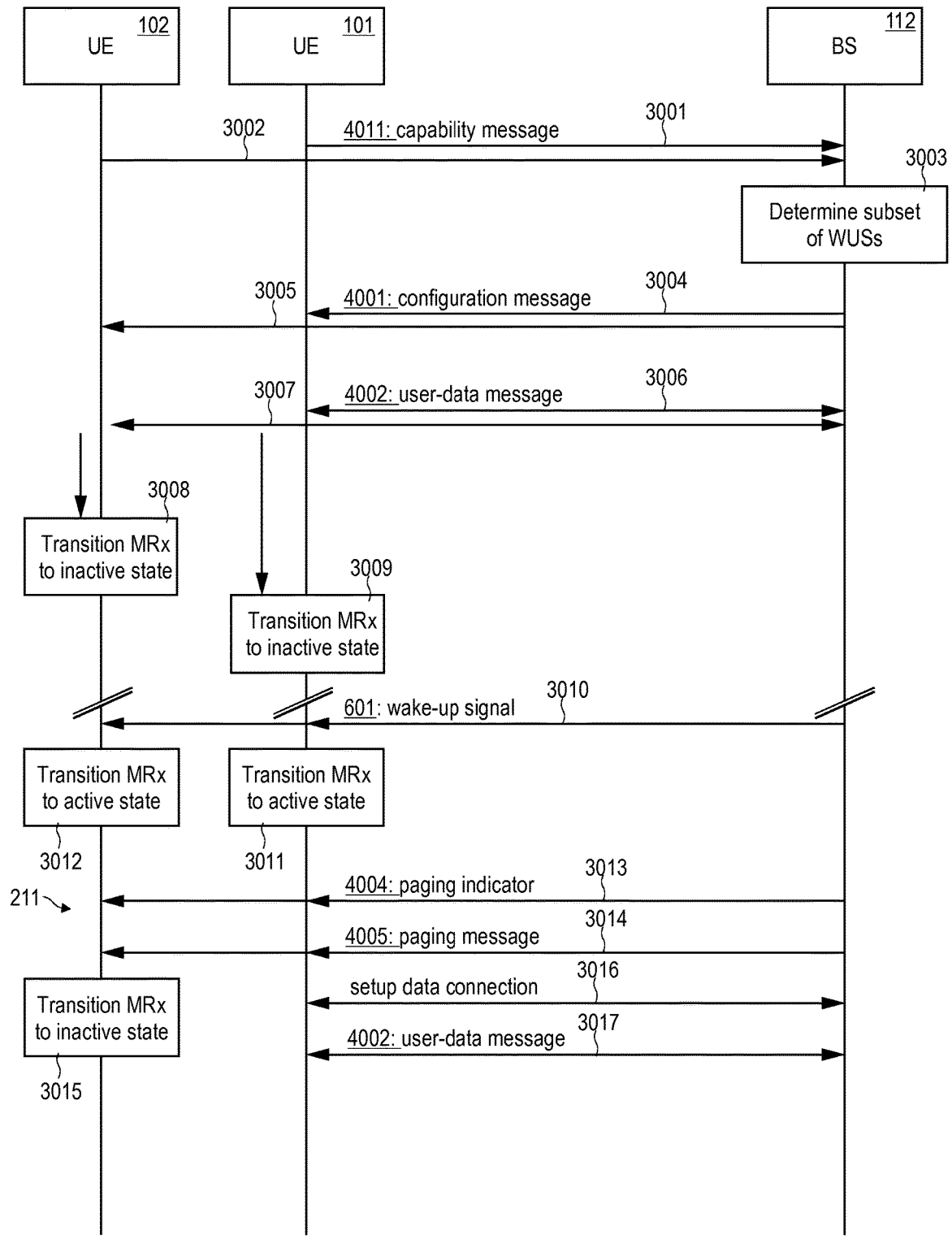
FIG. 10 is a signaling diagram of communication between the base station and UEs according to various examples.

FIG. 10 is a signaling diagram. FIG. 10 illustrates aspects with respect to communicating between the UE 101 and the BS 112 of the cell 161. FIG. 10 illustrates aspects with respect to transmitting and/or receiving (communicating) a WUS 601. In particular, FIG. 10 also illustrates aspects with respect to the inter-relationship between communication of a WUS and communication of paging signals and messages 4004, 4005 at a PO 211 that may be employed in the various examples described herein.

At 3001, a capability control message 4011 is communicated. The capability control message 4011 is transmitted by the UE 101 and received by the BS 112. For example, the capability control message 4011 may be communicated on a control channel, e.g., the physical uplink control change (PUCCH). For example, the capability control message 4011 may be a Layer 2 or Layer 3 control message. The capability control message 4011 may be relate to RRC/higher-layer signaling.

As will be explained in further detail below, the capability control messages 4011 are generally related to WUS capabilities of the respective UEs 101, 102. According to various examples, the capability control messages 4011 are indicative of a capability of the respective UE 101, 102 to support one or more WUS 601 of a predefined set of WUS 601 (WUS-related capability).

At 3002, a further capability control message 4011 is communicated. The capability control message 4011, at 3002, is transmitted by the UE 102 and received by the BS 112. The capability control message 4011 transmitted by the UE 102 generally corresponds to the capability control message 4011 transmitted by the UE 101; however, the information content may be different.

In the example of FIG. 10, for sake of simplicity, only the UEs 101, 102 are illustrated; however, generally, it would be possible that the BS 112 receives capability control messages 4011 from more than two UEs. For example, it would be possible that the BS 112 receives capability control messages 4011 from all connected UEs and/or all UEs camping on the respective cell in idle mode.

As a general rule, a UE 101-105 may transmit the capability control message 4011 upon connecting to the BS 112 or upon a request received from the BS 112.

As a general rule, there are various WUS-related capability conceivable that could be supported or not supported. Examples include indication of which waveform receptions are supported, which WUR sensitivity level is supported for WUS detection, and/or which minimum time offset is required and/or which maximum time offset is allowed between a WUS and the POs, e.g., for different WUS types.

To give a specific example, the capability control message 4011 transmitted, at 3001, by the UE 102 may be indicative of the UE 102 supporting a WUS 601 that is modulated OOK and also supporting a further WUS that is modulated using FSK. Differently, the capability control message 4011 transmitted, at 3002, by the UE 101, may be indicative of the UE 101 supporting the WUS 601 that is modulated using OOK, but not supporting the further WUS 601 that is modulated using FSK.

As a general rule, there are various options available for implementing such indication by the capability control messages 4011. In a first example, a codebook could be used, the codebook defining the predefined set of WUSs. Then, a bitmap could be used, wherein each position of the bitmap includes one bit that can either signal support or non-support of the associated WUS of the set of WUSs (cf. FIG. 11 where such a scenario is illustrated; here, the capability control message 4011 includes a 3-bit bitmap, where each position 4091-4093 of the 3-bit bitmap indicates the respective capability to support or non-support of a corresponding WUS 601-603). In a second example, a more explicit or detailed indication would be used including multi-bit information fields for various WUSs. In a third example, the UEs may even specify parameter ranges—e.g., defined by lower boundaries and/or upper boundaries—of signal design parameters of the WUSs that they support (cf. FIG. 8 where various such signal design parameters are discussed).

As discussed in connection with FIG. 2 above, the UE 101 and the UE 102 share the PO 211. Thus, the BS 112 can use the indicated WUS-related capability of the UEs 101, 102 *t* to determine a subset from the set of the WUSs, for use at the PO 211, block 3003. In the example of FIG. 10, the BS 112 determines a subset that includes a single WUS 601 using OOK (and does not include the WUSs 602, 603, e.g., using FSK).

The corresponding selection and/or other parameters related to the WUS functionality—e.g., the time offset and/or frequency offset of the WUS transmission with respect to the PO—may or may not be signaled to the UEs 101, 102 at 3004 and 3004, using configuration control messages 4001. In other words, the configuration control messages 4001 may be indicative of the determined subset. This communication is preferably done with system information signaling, but both broadcasted and dedicated signaling is possible.

The configuration control messages 4001 may be indicative of the signal design configuration of the WUS(s) included in the subset and transmitted with respect to the PO 211. Thereby, if a UE supports multiple types of WUSs 601, it may configure its WUR appropriately, in accordance with the indicated signal design configuration. Again, a codebook could be used, e.g., in connection with the bitmap that indicates use/non-use for each WUS in the respective set.

In some examples, the configuration control messages 4001 may be indicative of multiple WUSs included in the subset. Then, the UEs can select one or more of the multiple WUSs that will be transmitted with respect to a PO and configure its WURs accordingly. The selection may be based, e.g., power consumption, a predefined priority, etc.

As mentioned above, there are examples conceivable in which the determined subset includes multiple WUSs. Then, the multiple WUSs may be transmitted on different resources ahead of the PO. For example, time division duplexing and/or frequency division duplexing and/or code division duplexing may be employed. Therefore, multiple WUSs of the subset can use different time offsets and/or frequency offsets with respect to the PO. It would be possible that the configuration control message 4001 is indicative of the time offsets and/or frequency offsets of the multiple WUSs of the subset.

At 3006 and 3007, a user-data messages 4002 are communicated, between the BS 112 and each of the UEs 101, 102. For example, the user-data messages 4002 may be communicated on the respective payload channels 263. For example, the user-data message 4002 may be communicated along the data connections 189, e.g., as part of a bearer, etc. 4001, 4011, and 4002 are communicated with the MRXs 1351 of the UEs 101, 102.

Then, there is no more data to be communicated between the UEs 101, 102 and the BS 112. Transmit buffers are empty. After expiry of respective inactivity timers, the UE 101 and the UE 102 transition their MRXs 1351 to inactive state. The data connections 189 may be released. The WURs 1352 of the UEs 101, 102, on the other hand, can transition to active state, e.g., in accordance with a DRX cycle.

At some point in time the BS 112 intends to page the UE 101 (but the BS 112 does not intend to page the UE 102). The BS 112 cannot directly page the UE 101, because the MRX 1351 of the UE 101 is in the inactive state. Hence, at 3010, the BS 112 transmits the WUS 601, in accordance with the configuration control message 4001. The WUS 601 is communicated at a predefined time offset with respect to the PO 211 and/or at a predefined frequency offset with respect to the PO 211. The WUS 601 can be communicated on the channel 261 (cf. FIG. 3).

Both, the UE 101, as well as the UE 102 detect the WUS 601 transmitted at 3010. Typically, the WUS 601 is not indicative of an identity of the UE 101; therefore, at the point in time of receiving the WUS 601 at 3010, ambiguity exists at the UEs 101, 102 with respect to which of the UEs 101, 102 is intended to be paged.

Hence, both UEs 101, 102 then transition their MRXs 1351 to active state, upon detecting the WUS 601. The WURs 1352 of the UEs 101, 102 can be transitioned into inactive state.

Then, at 3013, a paging indicator 4004 is transmitted by the BS 112. The paging indicator 4004 is received by the MRX 1351 of the UE 101 and by the MRX 1351 of the UE 102. For example, the paging indicator may be transmitted on channel 262, e.g. PDCCH. The paging indicator 4004 includes the P-RNTI; however, the P-RNTI still does not resolve the ambiguity at the UE-side with respect to which UE is intended to be paged.

The paging indicator 4004 may include information on a MCS used for communicating a paging message 4005 at 3014. The paging message 4005 may be communicated on a shared channel 263, e.g., PDSCH (cf. FIG. 3). Generally, the paging indicator 4004 and the paging message 4005 may be communicated on different channels. The paging message 4005 may be modulated and encoded according to the MCS indicated by the paging indicator 4004. Thus, it may be required that the UE 101 receives, firstly, the paging indicator 4004 and, secondly, the paging message 4005.

The paging message 3014 is then indicative of the identity of the UE 101; but is not indicative of the identity of the UE 102, because the network does not attempt to page the UE 102. Hence, the MRX 1351 of the UE 102, upon receiving the paging message 4005 at 3014, is again transitioned into the inactive state, 3015.

At 3016, a data connection 189 is set up between the UE 101 and the BS 112. This may include a random access procedure and a RRC set up.

Finally, a UL or DL user-data message 4002 is communicated using the newly set up data connection 189 at 3017 between the UE 101 and the BS 112.

As will be appreciated from FIG. 10, by appropriately determining the subset of the set of WUSs at 3003, it is possible to support transmission of WUSs to multiple UEs 101, 102 sharing a PO 211—even in view of deviating/heterogeneous WUS-related capability to support one or more WUSs of the set of WUSs of the UEs 101, 102 sharing the PO 211. As a general rule, various strategies are available for determining the subset. Some examples strategies are explained below with respect to FIG. 11.

Figure 12:
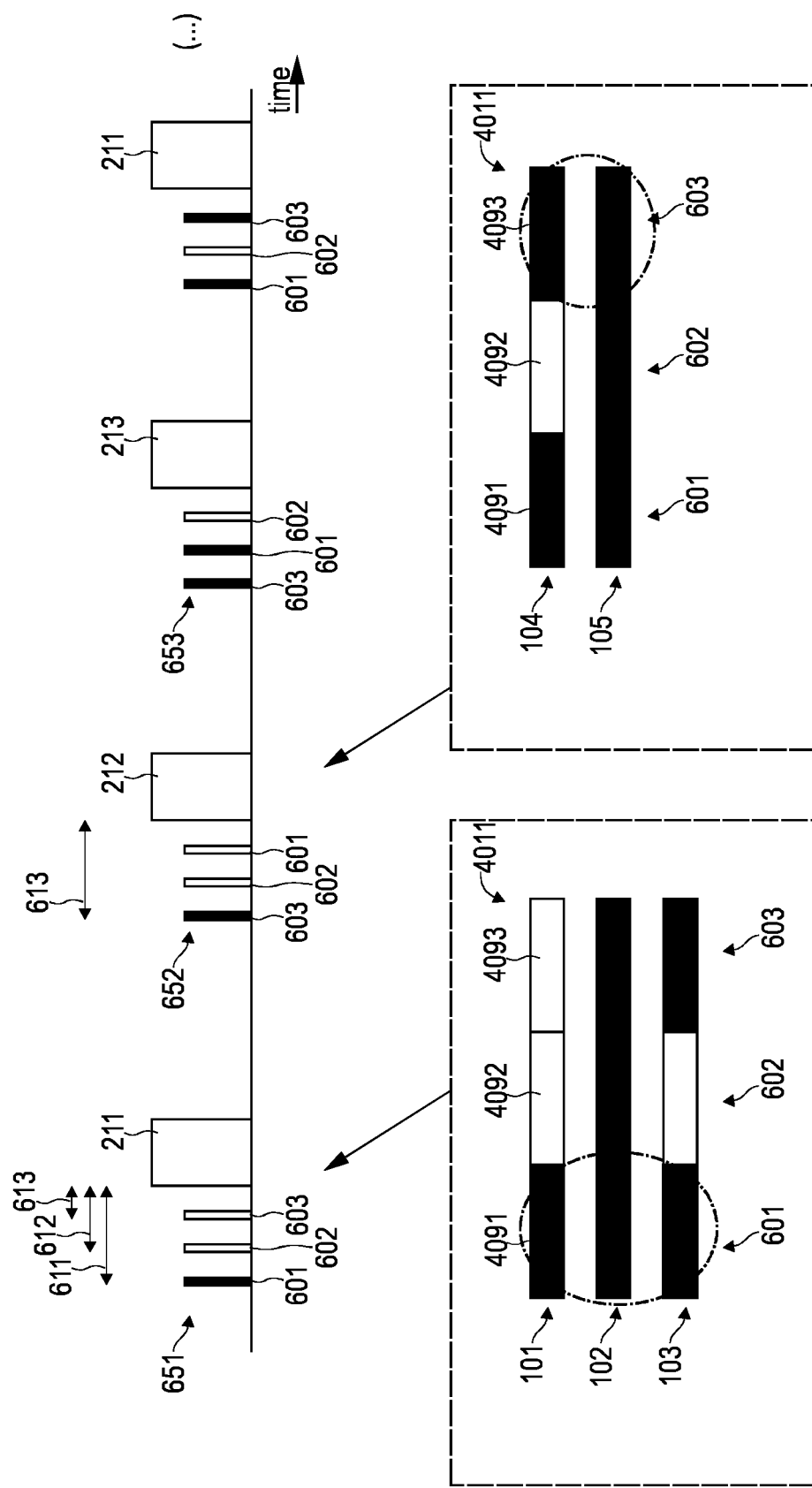
FIG. 12 schematically illustrates the use of WUS at multiple POs according to various examples.

FIG. 12 schematically illustrates aspects with respect to determining subsets of a set of WUSs based on the WUS-related capabilities of UEs 101-105 sharing POs 211-213.

As illustrated in FIG. 12, there are multiple POs 211-213. Each PO 211-213 is repeated over the course of time. Typically, multiple UEs 101-105 share a PO 211-213. For example, the UEs 101-103 share the PO 211 and the UEs 104, 105 share the PO 212 (also cf. FIG. 2); other UEs may share the PO 213.

Sharing a PO 211-213 means that the network would communicate any paging signal(s) to one of the UEs that share a given PO 211-213 during the given PO 211-213. Hence, generally, it would be possible that, at a given PO, multiple paging signals are communicated to page multiple UEs 101-105 that share the given PO.

In the example of FIG. 12, there is a set 650 of three different WUS 601-603 available, e.g., in accordance with a predefined codebook. For example, the different WUS 601-603 of the set 650 may differ in terms of the modulation scheme or constellation mapping. Generally, one or more parameters of the signal design of the WUS 601-603 may be varied across the WUSs of the supported set 650 (cf. FIG. 8).

As illustrated in FIG. 12, the WUSs 601-603 all have different time offsets 611-613 with respect to the start of the POs 211-213. This corresponds to a time division duplex implementation of the WUS 601-603; in other scenarios, this could be replaced or combined with frequency division duplexing and/or code division duplexing.

As illustrated in FIG. 12, for each PO 211-213, the BS 112 determines a subset 651-652 of the set 650 of WUS 601-603: for example, the subset 651 associated with the PO 211 includes the WUS 601, but does not include the WUSs 602, 603. Hence, only the WUS 601 is transmitted ahead of the PO 211 (cf. FIG. 10). The subset 652 associated with the PO 212 includes only the WUS 603 and the subset 653 associated with the PO 213 includes the WUS 601, 603.

The determination of a subset 651-653 from the set 650 of WUSs 601-603 is based on the WUS-related capabilities reported by the respective UEs 101-105, e.g., using a respective capability control message (cf. FIG. 10: capability control message 4011). It would also be possible to determine the time offsets 611-613 based on the reported WUS-related capabilities of the UEs 101-103.

As a general rule, various strategies are available for determining a subset 651-653. Some of these strategies are explained below. The strategies explained below may be combined with each other in other scenarios.

For example, a subset 651-653 could be determined based on a comparison of the WUS-related capabilities of the UEs 101-105 that share a respective PO 211-213. The respective decision finding in connection with determining the subset 651 for the PO 211 is explained in connection with the inset of FIG. 12 (dashed line) as an illustrative example. The inset of FIG. 12 illustrates the capability control messages 4011 received at the BS 112 from the UEs 101-103 that share the PO 211. As illustrated, the WUS-related capability of the UE 101 is such that the respective WUR 1352 supports the WUS 601, but does not support the WUS 602, 603. The WUS-related capability of the UE 102 is such that the WUR 1352 of the UE 102 supports all WUS 601-603; and the WUS-related capability of the UE 103 is such that the WUR 1352 of the UE 103 supports the WUS 601 and the WUS 603, but does not support the WUS 602. The subset 651 can then be determined based on a comparison of the WUS-related capabilities of the UEs 101-103. This yields the subset 651 including only the WUS 601 (dashed-dotted line in FIG. 12).

Other decision criteria may be taken into account when determining a subset 651-653 from the set 650 of available WUSs 601-603. For example, it would be possible to determine a count of UEs 101-105 that support a given WUS 601-603 of the set 650 of WUSs. Then, if that count exceeds a certain predefined threshold, the corresponding WUS 601-603 could be included in the subset for use at the corresponding PO 211-213. For example, referring to the scenario FIG. 12 with respect to the PO 601 (as illustrated by the inset of FIG. 12): here, the count of UEs 101-103 supporting the WUS 601 is three; the count of UEs 101-103 supporting the WUS 602 is one; and the count of UEs 101-103 of UE supporting the WUS 603 is two.

A further example is illustrated in connection with the PO 212. As discussed in connection with FIG. 2 above, the UEs 104, 105 share the PO 212. A further inset of FIG. 12 illustrates the capability control messages 4011 received at the BS 112 from the UEs 104-105 that share the PO 212. As illustrated, the capability of the UE 104 is such that the WUR 1352 of the UE 104 supports the WUSs 601 and 603; while the WUR 1352 of the UE 105 supports all WUS 601-603. Thus, in principle, the BS 112 may be free to choose between the WUS 601 and/or the WUS 603 to be included in the subset 652. In the example of FIG. 12, the subset 652 of WUSs for use at the PO 212 only includes the WUS 603. This is because it would be possible that the WUS 601-603 are ranked in accordance with the priority. For example, the WUS 601 may be ranked with a lower priority if compared to the priority with which the WUS 603 is ranked. Then, in view of the count of UEs 104, 105 supporting the WUS 601, 603 being the same, a decision can be made in view of the priority. Therefore, use of the WUS 603 is preferred over use of the WUS 601. The priority may be predefined, e.g., hardware encoded.

As a general rule, various options would be available for determining such a priority, including but not limited to: spectral overhead associated with the various WUS 601-603; and power efficiency of the various WUS 601-603. Hence, as a general rule, it would be possible that the subset is determined based on an estimated aggregated or individual power consumption at the UEs for receiving the respective one or more WUSs included in the subset. Alternatively or additionally, it would also be possible that the subset is determined based on an estimated control signaling overhead associated with signaling of the one or more WUSs included in the subset.

In FIG. 12 the time offset 613 of the WUS 603 at the PO 211 has been increased, e.g., to support respective increased latencies of the UEs 104, 105 to transition the MRX into the active state (as may be indicated by the capability control messages 4011). As a general rule, the time offsets 611-613 may be determined based on the indicated capabilities of the UEs. For example, in connection with PO 212, the WUS 603 has a longer time offset 613.

Sometimes, in view of the balance between power efficiency and control signaling overhead, it may even be desirable to deactivate the WUS functionality for a given UE: this could be the case where the count of UEs that support the same WUS(s) as the given UE is low. This could be signaled to the given UE using the configuration control message 4001 (cf. FIG. 10).

Figure 13:
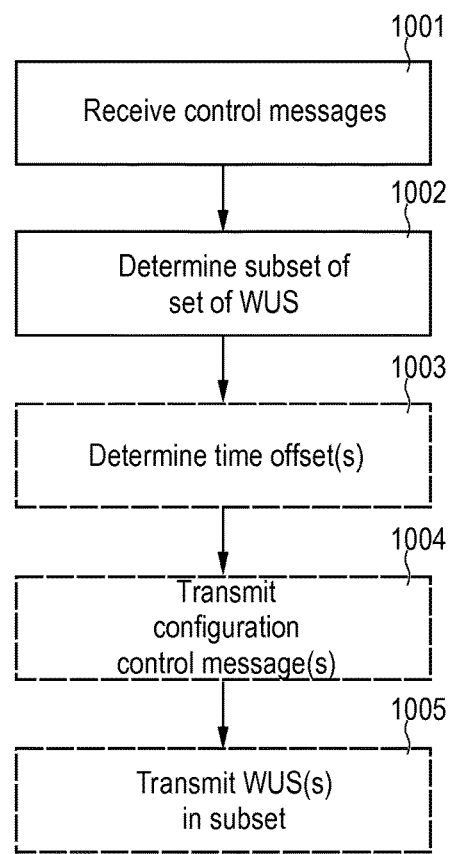
FIG. 13 is a flowchart of a method according to various examples.

FIG. 13 is a flowchart of a method according to various examples. The method of FIG. 13 is implemented by a node of a communication system: For example, the method of FIG. 13 could be executed by the control circuitry 1122 of the BS 112. It would also be possible that the method of FIG. 13 is implemented by control circuitry of the AMF 131 or the SMF 132.

Initially, at 1001, the node receives control messages from multiple UEs. The control messages are indicative of capabilities of the UEs to support one or more WUSs of a set of WUSs. In detail, the control messages may be indicative of capabilities of the UEs to respectively support one or more WUSs of a set of WUSs. In further detail, a first control message may be received from a first one of the UEs and may be indicative of the capability of the first UE to support one or more WUSs from the set of WUSs. For example, the first UE may support WUSs A, C, and D from a set {A,B,C,D}, but may not support WUS B. A second control message may be received from a second one of the UEs and may be indicative of the capability of the second UE to support one or more WUSs from this set of WUSs. For example, the second UE may support WUSs A and D from the set {A,B,C,D}, but may not support WUSs B and C. This example can be extended to more than two UEs and to an arbitrary count of WUSs in the set.

At 1001, for example, the capability control messages 4011 may be received (cf. FIG. 10). The multiple UEs, in the example scenario of FIG. 13, share a PO.

As a general rule, a UE connecting to a network, e.g., registering as a camping UE in a cell can be transmitting its UE capabilities to the network. For example, the UE can transmit information indicative of the WUR capabilities within such UE capability reporting or similar type of UE information signaling to the network, e.g., another type of RRC signaling message.

Figure 11:
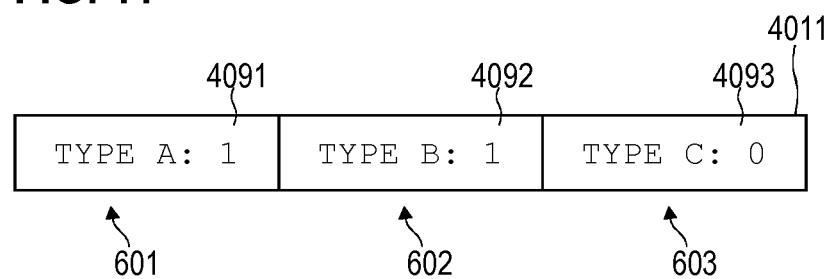
FIG. 11 schematically illustrates a capability control message according to various examples.

At 1002, the node determines a subset of the set of available WUSs, based on the capabilities of the UEs indicated at 1001 (cf. FIG. 11 where the determination of the WUSs for use at a PO 211-213 are illustrated).

There is a wide variety of options available to determine the subset. A few examples are given below: For example, a subset 651-653 could be determined based on a comparison of the WUS-related capabilities of the UEs 101-105 that share a respective PO 211-213. In a further example, it would be possible to determine a count of UEs 101-105 that support a given WUS 601-603 of the set 650 of WUSs. Then, if that count exceeds a certain predefined threshold, the corresponding WUS 601-603 could be included in the subset for use at the corresponding PO 211-213. A still further example includes taking a prioritization/ranking of the various WUSs 601-603 into account. As a general rule, various options would be available for determining such a priority, including but not limited to: spectral overhead associated with the various WUS 601-603; and power efficiency of the various WUS 601-603. Such examples can be combined with each other, to form further examples.

At optional block 1003, the node determines time offsets for all WUSs included in the subset (cf. FIG. 11 where the time offsets 611-613 are illustrated). The time offsets are defined with respect to the respective PO. For example, the time offsets can be dimensioned to enable sufficient time for the MRX to transition into active state. A corresponding constraint can also be indicated as part of the control messages of block 1001.

Next, at optional block 1004, one or more configuration control messages are transmitted to the UEs that share the PO. For example, the configuration control messages could be indicative of the subset of WUSs for use at the respective set PO. It would be possible that the configuration control messages are indicative of the associated time offsets.

At optional block 1005, the one or more WUSs included in the subset are transmitted ahead of the PO at the appropriate time offsets. Optionally, a frequency offset with respect to the PO could be taken into account.

Since each PO is related to a group of UEs, there will be different combinations of UEs assigned to each PO, i.e., sharing a PO. The network can then take the information on UE capability into account to determine the WUSs to be used for each group of UEs assigned to the different POs. In other words, the method of FIG. 13 may be repeated for each of multiple groups of UEs that share a PO.

Figure 14:
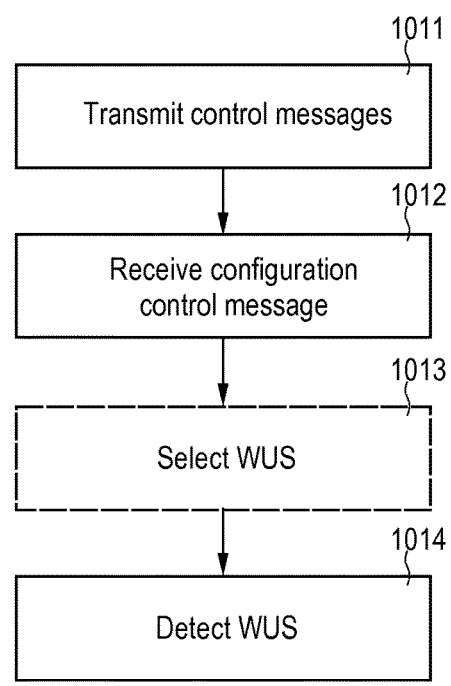
FIG. 14 is a flowchart of a method according to various examples.

FIG. 14 is a flowchart of a method according to various examples. The method of FIG. 14 is implemented by a node of a communication system: For example, the method of FIG. 14 could be executed by the control circuitry 1012 of the UE 101.

At block 1011, a control message is transmitted which is indicative of the capability of the node to support one or more WUSs of a set of WUSs. As such, block 1011 as inter-related to block 1001.

Next, at block 1012, a configuration control message is received which is indicative of a subset of the set of WUSs. The subset includes at least one WUS. As such, block 1012 is inter-related to block 1004.

Scenarios are conceivable in which the configuration control message of block 1012 is indicative of a subset that includes multiple WUSs. At least some of these multiple WUSs of the subset may be supported by the node. Then, it would be possible that a given WUS is selected from the subset based on one or more decision criteria. Example decision criteria include power consumptions associated with the multiple WUSs included in the subset; and a predefined priorities associated with the multiple WUSs included in the subset. Then, the WUR used for detecting the selected WUS can be configured accordingly. By such techniques, the UE can tailor its reception strategy. For example, such techniques may enable the UE to achieve the lowest idle mode energy consumption possible.

At block 1014, a WUS of the subset is detected. As such, block 1013 is inter-related to block 1005. The WUS can be detected at a time offset and/or a frequency offset with respect to a PO assigned to the respective node. For example, the time offset and/or the frequency offset could be indicated by the configuration control message of block 1 and 12.

In some examples, it would even be possible that the configuration control message, received at block 1012, is indicative of deactivation of the WUS functionality. In that case, block 1014 would not be executed; rather, the node would attempt to receive a paging signal directly at the PO.

Summarizing, above, techniques have been described which enable UEs to inform the network about which different WUS options are supported. Techniques have been described which enable the network to determine which WUSs to activate. The network may possibly select different parameters of a signal design of the WUSs, depending on such information on the UE capabilities. The network could then communicate a set of suitable WUS design combinations based on the indicated capabilities.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various examples have been described with respect to WUS techniques employed in a cellular network. Similar techniques may be readily applied to other kinds and types of networks, e.g., ad-hoc networks, infrastructure networks, etc.

For further illustration, various examples have been described in which a WUS is not indicative of a particular UE, i.e., in which the WUS does not include an identity associated with the respective UE. Then, the equities at the UEs with respect to which UE is attempted to be paged by the network can only be resolved at a later point in time, e.g., based on an indicator included in the paging message. However, in some examples, it would also be possible that the WUS is indicative of the particular UE attempted to be paged by the network, e.g., by selection of an appropriate a sequence that correlates with an identity of the respective UE.

For still further illustration, various examples have been described in connection with an implementation in which a subset including at least one WUS is determined from a set of one or more WUS by a BS of a RAN. In other examples, such and related functionality with respect to the WUS strategy may also be implemented by a CN node of a cellular network, e.g., by a mobility control node such as an AMF or SMF.

For still further illustration, various examples have been provided for multiple UEs with different capabilities sharing the same PO. Generally, also UEs not sharing a common PO may indicated their WUS-related capabilities as explained above. Also in such a scenario the network may make an appropriate selection regarding the WUSs to use at the respective POs.

The invention claimed is:

1. A method of operating a network node, comprising:
receiving respective control messages from a plurality of terminals being indicative of respective capabilities of the plurality of terminals, which share a paging occasion, to support one or more wake-up signals of a set of wake-up signals, wherein the wake-up signals of the set of wake-up signals have different modulation schemes or different modulation constellations, and the respective capabilities of the plurality of terminals indicate at least respectively supported modulation schemes or modulation constellations; and
determining a subset from the set of wake-up signals based on the respective capabilities of the plurality of terminals sharing the paging occasion indicated by the received control messages, wherein determining the subset includes comparing the respective capabilities of the plurality of terminals and selecting one or more wake-up signals based on the comparison to include in the subset,
wherein the subset including at least one wake-up signal for use at the paging occasion shared by the plurality of terminals having a modulation scheme or modulation constellation selected based on the respectively supported modulation schemes or modulation constellations indicated by the plurality of terminals.

2. The method of claim 1, further comprising:
determining a count of the plurality of terminals supporting a given wake-up signal of the set of wake-up signals and including the given wake-up signal in the subset if the count exceeds a predefined threshold.

3. The method of claim 1,
wherein the wake-up signals of the set of wake-up signals are ranked in accordance with a priority,
wherein the subset is determined based on the priority.

4. The method of claim 1,
wherein the subset is determined based on an estimated aggregated or individual power consumption at the plurality of terminals for receiving the at least one wake-up signal.

5. The method of claim 1,
wherein the subset is determined based on an estimated control-signaling overhead associated with signaling the at least one wake-up signal.

6. The method of claim 1, further comprising:
transmitting a configuration control message indicative of the determined subset to the plurality of terminals.

7. The method of claim 1, further comprising:
transmitting the at least one wake-up signal included in the subset at a time offset and/or a frequency offset with respect to the respective paging occasion.

8. The method of claim 1, further comprising:
deactivating a wake-up signaling functionality for at least one of the plurality of terminals based on the capabilities of the plurality of terminals.

9. The method of claim 1, further comprising:
receiving further control messages from further terminals that share a further paging occasion, the further control messages being indicative of further capabilities of the further terminals to respectively support the one or more wake-up signals of the set of wake-up signals, and
determining a further subset of the set of wake-up signals based on the further capabilities of the further terminals, the further subset including at least one further wake-up signal for use at the further paging occasion,
wherein the subset and the further subset are at least partly different.

10. A method of operating a terminal, comprising:
transmitting a control message to a network, the control message being indicative of a capability of the terminal to support one or more wake-up signals of a set of wake-up signals, wherein the wake-up signals of the set of wake-up signals have different modulation schemes or different modulation constellations and the capability of the terminal indicates supported modulation schemes or modulation constellations;
receiving a configuration control message from the network based on the control message transmitted, the configuration control message being indicative of a subset of the set of wake-up signals, the subset including at least one wake-up signal for use at a paging occasion shared by the terminal with other terminals, wherein the at least on wake-up signal being selected based on a comparison of the capability of the terminal to respective capabilities of the other terminals, the at least one wake-up signal having a modulation scheme or modulation constellation selected based on supported modulations schemes or modulation constellations indicated by the terminal and the other terminals; and
detecting a given wake-up signal of the at least one wake-up signal included in the subset at the paging occasion.

11. The method of claim 10,
wherein the subset includes multiple wake-up signals, wherein the method further comprises:
selecting the given wake-up signal from the subset based on at least one of a power consumption for receiving each one of the multiple wake-up signals and a predefined priority associated with each one of the multiple wake-up signals.

12. The method of claim 10,
wherein the at least one wake-up signal is received at a time offset and/or a frequency offset with respect to the paging occasion.

13. The method of claim 12,
wherein the configuration control message is indicative of the time offset and/or the frequency offset.

14. A network node configured to:
receive respective control messages from a plurality of terminals being indicative of respective capabilities of the plurality of terminals, which share a paging occasion, to support one or more wake-up signals of a set of wake-up signals, wherein the wake-up signals of the set of wake-up signals have different modulation schemes or different modulation constellations, and the respective capabilities of the plurality of terminals indicate at least respectively supported modulation schemes or modulation constellations; and
determine a subset from the set of wake-up signals based on the respective capabilities of the plurality of terminals shared the paging occasion indicated by the received control messages, wherein to determine the subset, the network node is configured to compare the respective capabilities of the plurality of terminals and selecting one or more wake-up signals based on the comparison to include in the subset,
wherein the subset including at least one wake-up signal for use at the paging occasion shared by the plurality of terminals having a modulation scheme or modulation constellation selected based on the respectively supported modulation schemes or modulation constellations indicated by the plurality of terminals.

15. The network node of claim 14, wherein the network node is configured to perform:
determining a count of the plurality of terminals supporting a given wake-up signal of the set of wake-up signals and including the given wake-up signal in the subset if the count exceeds a predefined threshold.

16. A terminal configured to:
transmit a control message to a network, the control message being indicative of a capability of the terminal to support one or more wake-up signals of a set of wake-up signals, wherein the wake-up signals of the set of wake-up signals have different modulation schemes or different modulation constellations and the capability of the terminal indicates supported modulation schemes or modulation constellations;
receive a configuration control message from the network based on the control message transmitted, the configuration control message being indicative of a subset of the set of wake-up signals, the subset including at least one wake-up signal for use at a paging occasion shared by the terminal with other terminals, wherein the at least on wake-up signal being selected based on a comparison of the capability of the terminal to respective capabilities of the other terminals, the at least one wake-up signal having a modulation scheme or modulation constellation selected based on supported modulations schemes or modulation constellations indicated by the terminal and the other terminals; and
detect a given wake-up signal of the at least one wake-up signal included in the subset at the paging occasion.

17. The terminal of claim 16,
wherein the subset includes multiple wake-up signals, and
wherein the terminal is configured to perform
    selecting the given wake-up signal from the subset based on at least one of a power consumption for receiving each one of the multiple wake-up signals and a predefined priority associated with each one of the multiple wake-up signals.

\* \* \* \* \*